United States Patent [19]

Lidwell

[11] Patent Number: 4,494,819
[45] Date of Patent: Jan. 22, 1985

[54] TELESCOPE OBJECTIVE SYSTEM FOR THE INFRARED RANGE

[75] Inventor: Michael O. Lidwell, Glasgow, Scotland

[73] Assignee: Barr & Stroud Limited, Glasgow, Scotland

[21] Appl. No.: 566,699

[22] Filed: Dec. 29, 1983

Related U.S. Application Data

[63] Continuation of Ser. No. 234,439, Feb. 13, 1981, abandoned.

[30] Foreign Application Priority Data

Mar. 5, 1980 [GB] United Kingdom ............... 8007406

[51] Int. Cl.$^3$ ............................................. G02B 13/14
[52] U.S. Cl. ...................... 350/1.4; 350/475; 350/1.1
[58] Field of Search ............... 350/475, 1.4, 1.3, 454

[56] References Cited

U.S. PATENT DOCUMENTS

| | | | |
|---|---|---|---|
| 3,363,962 | 1/1968 | Vogl | 350/1.4 |
| 3,778,133 | 12/1973 | Tatian | 350/1.4 |
| 3,817,604 | 6/1974 | Watt | 350/457 |
| 3,883,214 | 3/1975 | Hoffman | 350/1.4 |
| 4,190,324 | 2/1980 | Arai | 350/475 |

Primary Examiner—John K. Corbin
Assistant Examiner—Paul M. Dzierzynski
Attorney, Agent, or Firm—Mason, Fenwick & Lawrence

[57] ABSTRACT

A telescope objective system (10) is formed by a primary lens having a single lens element (A) aligned on a common optical axis (11) with a secondary lens having two lens elements (B,C) the shape and power distribution of lens elements (A,B,C) being such as to compensate for monochromatic aberration of the system, each lens element (A,B,C) being made of a material which has a useful spectral bandpass in the infrared wavelength region and lens elements (B,C) having refractive surfaces (16, 15, 14, 13) intercepting the optical axis (11) which are substantially spherical, the system having a planar image surface (11) and an effective focal length greater than the axial distance between the image surface (11) and the distal refractive surface (18) formed by the primary lens element (A). Primary lens element (A) is positively powered and made of germanium and at least one of the secondary lens elements (B,C) is made of a Chalcogenidae glass such that the system (10) is achromatic in the infrared wavelength region. Conveniently lens element (B) is made of Chalcogenide glass and is negatively powered. Lens element (C) may be negatively powered and made of germanium, or positively powered and made of a Chalcogenide glass.

3 Claims, 3 Drawing Figures

TELESCOPE OBJECTIVE SYSTEM FOR THE INFRARED RANGE

This is a continuation of application Ser. No. 234,439, filed Feb. 13, 1981 abandoned.

This invention relates to telescope objective systems having a useful spectral bandpass in the infrared wavelength region.

The detection and recognition of objects at long ranges using thermal imaging equipment ultimately depends upon the quality of the telescope objective system which for practical purposes requires to be compact and economic to produce. Previously known objective systems for this purpose have used lens elements made of optical-grade germanium which has a high refractive index and, in comparison with materials used for the visible spectrum, low dispersion coefficient. The shape and power distribution of the lens elements has been selected, in known manner, to compensate for monochromatic aberration. The telephoto form of the objective system which is particularly desirable because of its short overall length is found to accentuate the chromatic aberration of the system thereby restricting the waveband of infrared radiation that can be successfully transmitted. Chromatic aberration arises because of the small but significant dispersion of the germanium material. In addition to the chromatic aberration problem an image-surface shift problem arises due to the high thermal coefficient of the refractive index of germanium. That is, significant variations in ambient temperature cause the image surface to shift from its design position and there is a need to provide a mechanism which can compensate for this shift if it causes deterioration of imaging performance under operating conditions.

It is an object of the present invention to provide an improved telescope objective system which is of telephoto form and achromatic in the infrared wavelength region.

According to the present invention there is provided a telescope objective system formed by a primary lens having a single lens element aligned on a common optical axis with a secondary lens having two lens elements the shape and power distribution of the lens elements being such as to compensate for monochromatic aberration of the system, each lens element being made of a material which has a useful spectral bandpass in the infrared wavelength region and the lens elements of the secondary lens having refractive surfaces intercepting said optical axis which are substantially spherical, the system having a planar image surface and an effective focal length greater than the axial distance between the image surface and the distal one of said refractive surfaces, said distal refractive surface being formed by said primary lens element which is positively powered and made of germanium, at least one of the two lens elements of the secondary lens being made of a chalcogenide glass such that the system is achromatic in the infrared wavelength region.

It will be noted that because the effective focal length of the system is greater than the axial distance between the image surface and the refractive surface on which the radiation is initially incident the system is of telephoto form; with only three lens elements the system is optically and mechanically simple; and because of the compensation for both monochromatic and chromatic aberrations the performance can approach the diffraction limit over an appreciable waveband.

Conveniently the middle one of the three lens elements is negatively powered and made of a chalcogenide glass. The lens element adjacent the image surface may be positively or negatively powered and made of germanium, or a chalcogenide glass. The two lens elements of the secondary lens may each be made of the same chalcogenide glass. Alternatively, the secondary lens may be formed with differing chalcogenide glasses the middle lens element of the three having a lower dispersion coefficient than the lens element adjacent the image surface.

The achromatizing lens element may be a chalcogenide glass such as that sold by Barr and Stroud Limited under their designations BSA, BS1 or BS2; or that sold by Texas Instruments Inc. of U.S.A. under their designation TI20 or TI1173; or that sold by Amorphous Materials Inc., of Garland, Tex., U.S.A. under their designation AMTIR-1.

Where the secondary lens has a positively powered lens element this may conveniently be made of a halide crystal material, which has a positive thermal coefficient in order to render the system athermal. Convenient halide crystal materials with a bandpass in the infrared wavelength region are KRS5 and KRS6 both of which are sold by the Harshaw Chemical Co., 6801 Cochran Road, Selon, Ohio, U.S.A. With this arrangement the lens elements are preferably fixedly mounted with respect to each other with inter element mount spacers of the correct thermal expansion coefficients, e.g. dural mounts to prevent movement of image position so that image degradation does not occur for temperature variations in the $-30°$ to $+50°$ C. range.

Embodiments of the present invention will now be described by way of example with reference to the accompanying drawings, in which.

Figure 1:
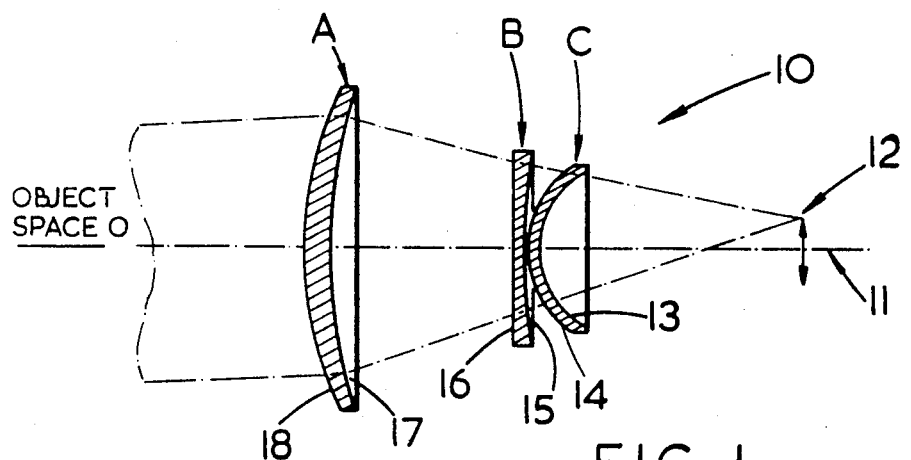
FIG. 1 shows a system in which the middle lens element is relatively flat.

In each of the drawings the objective system 10 comprises three air-spaced lens elements A, B, C which are aligned on a common optical axis 11. A planar image surface is formed at 12. Element A constitutes the primary lens and elements B and C together constitute the secondary lens of the system. Each secondary lens element B, C has spherical refractive surfaces intercepting the axis 11, the refractive surfaces being 13, 14, 15, 16, ordered sequentially in the direction away from the image surface 12. The refractive surfaces 17, 18 of the primary lens element A may be spheric or aspheric. Thus, radiation from object space O is incident on surface 18 and is refracted by lens elements A, B and C to form an image at surface 12.

In accordance with the present invention the lens elements A, B and C are each made of a material which has a useful spectral bandpass in the infrared wavelength region, particularly the 8-13 micron $\mu$m) range and the effective focal length of the system 10 is greater than the axial distance between refractive surface 18 and image surface 12, i.e. the system 10 has a telephoto form.

Figure 2:
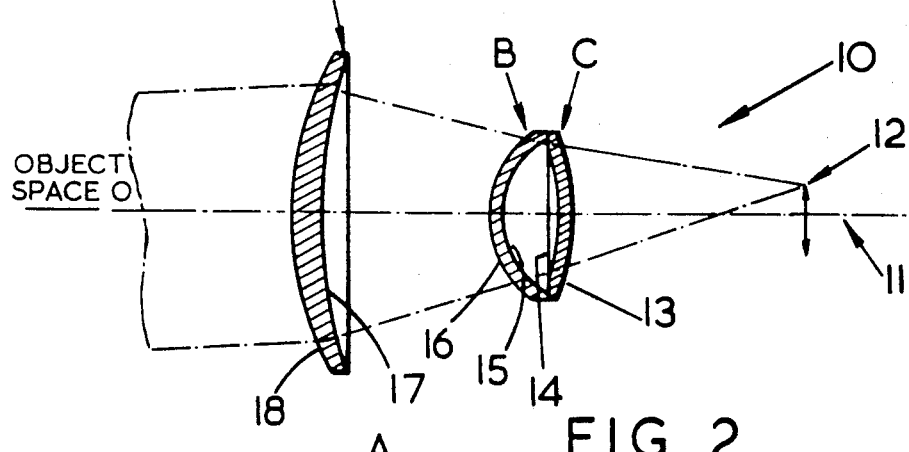
FIG. 2 shows a system in which the lens element adjacent the image surface is relatively flat.
Figure 3:
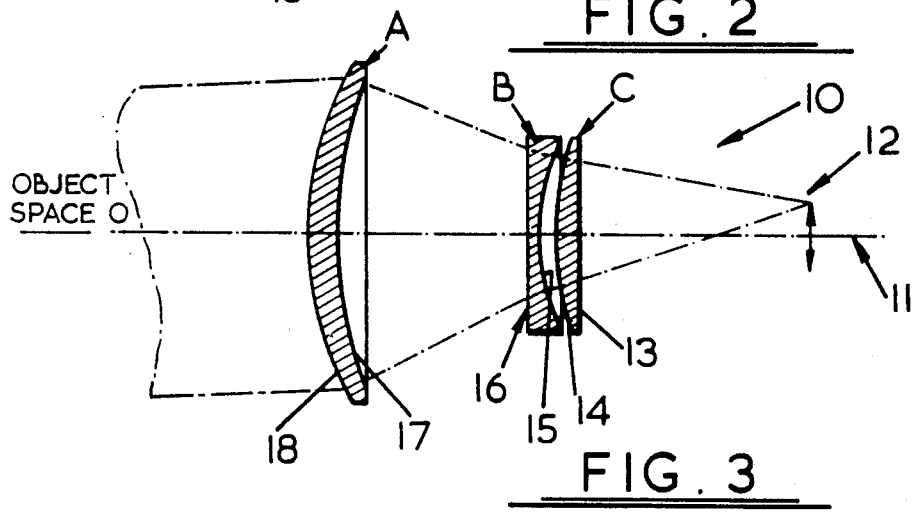
FIG. 3 shows a system in which the two lens elements adjacent the image surface are each relatively flat.

In each embodiment lens element A is positively powered (i.e. convergent) and is made of optical grade germanium. In FIG. 1, lens element C is also made of germanium but is negatively powered (i.e. divergent) and element B is made of a chalcogenide glass and is negatively powered. In FIG. 2 lens element B is made of germanium and is negatively powered and lens element C is made of a chalcogenide glass and is negatively powered. In FIG. 3 lens element B is made of a chalcogenide glass and is negatively powered and element C is positively powered and may be either a chalcogenide glass or a halide crystal material.

In the case of the FIG. 1 and FIG. 2 embodiments achromatisation of the system 10 is achieved by the lens element which is chalcogenide glass, these glasses being more dispersive than germanium. In the case of the FIG. 3 embodiment where two chalcogenide glass elements are employed these are most effective when the dispersions of the two glasses are matched to ensure minimum overall length of the system 10 simultaneously with the achievement of full achromatisation. It will also be noted that in each embodiment the lens element made of chalcogenide glass is relatively small and relatively flat (i.e. the refractive surfaces are of large radius of curvature). This is advantageous in that known chalcogenide glasses do not display optical homogeneity of refractive index over very large surface areas.

Four specific examples of objective systems will now be given relating to the three embodiments described and in which the lens elements are either germanium or chalcogenide glass and all refractive surfaces are spheric.

Example 1 relates to the embodiment of FIG. 1; lens elements A and C are each germanium and lens element B is chalcogenide glass made by Barr and Stroud Limited and designated BS1. The effective focal length is 375 mm, the back focal length is 157.4 mm and the separation and radius of curvature of the refractive surfaces is given in the table reading from surface 18 in the direction of the image surface 12 (dimensions being in mm):

| Separation | Radius |
|---|---|
| — | 208.2 |
| 14.1 | 283.7 |
| 108.5 | 1262.3 |
| 8.0 | 482.8 |
| .5 | 59.9 |
| 5.6 | 53.1 |

It will be understood that when the radius of curvature is positive the centre of curvature lies on the image plane side of the refractive surface. Negative signs would indicate the opposite.

Example 2 relates to the embodiment of FIG. 2; lens elements A and B are each germanium and lens element C BS1 chalcogenide glass. The effective focal length is 1.00, the back focal length is 0.393, and the separation and radius of curvature of the refractive surfaces is given in the table reading from surface 18 in the direction of the image surface 12 (dimensions being normalized):

| Separation | Radius |
|---|---|
| — | 0.5011 |
| 0.0400 | 0.6291 |
| 0.2538 | 0.1549 |
| 0.0150 | 0.1382 |
| 0.1000 | −0.4366 |

-continued

| Separation | Radius |
|---|---|
| 0.0200 | −0.5156 |

Example 3 relates to the embodiment of FIG. 3; lens element A is germanium and lens elements B and C are each BS1 chalcogenide glass. The effective focal length is normalised to 1.00, the back focal length is 0.3994 and the separation and radius of curvature of the refractive surfaces is given in the table reading from surface 18 in the direction of the image surface 12 (dimensions being normalised):

| Separation | Radius |
|---|---|
| — | 0.5926 |
| .0427 | 0.7692 |
| 0.3948 | −3.2968 |
| .0160 | 0.3825 |
| .0267 | 0.6204 |
| .0267 | −1.5895 |

Example 4 relates to the embodiment of FIG. 3; lens element A is germanium, lens element B is BSA chalcogenide glass and lens element C is BS1 chalcogenide glass. The effective focal length is 375 mm, the back focal length is 138.178 mm and the separation and radius of curvature of the refractive surfaces is given in the table reading from surface 18 in the direction of the image surface 12 (dimensions in mm):

| Separation | Radius |
|---|---|
| — | 195.33 |
| 15.65 | 268.99 |
| 113.37 | 825.5 |
| 6.05 | 109.22 |
| 10.98 | 199.06 |
| 10.00 | −2583.9 |

The examples described above in common with previously known all-germanium designs can only be maintained in focus over a range of temperatures by appreciable axial movement of the primary or secondary lens. However a substantial improvement in thermal stability of image surface 12 can be achieved in the embodiment of FIG. 3 by making lens element C of halide crystal material (which is a commercially-available infrared transmitting material). This permits the lens elements to be fixedly mounted and spaced apart with a material of normal thermal expansion. Thus, in examples 3 and 4 KRS5 material replaces BS1 material and because KRS5 is less dispersive than BS1 lens element B also requires to have reduced dispersion and conveniently is BS2 chalcogenide glass.

A specific example, example 5, is now given, compensatal for dural spacers, the effective focal length being normalised to 1.00, the back focal length being 0.4934 and the separation and radius of curvature of the refractive surfaces is detailed in the table reading from surface 18 in the direction of the focal surface 12 (normalised dimensions):

| Separation | Radius |
|---|---|
| — | .5117 |
| .0427 | .6424 |
| .3028 | 7.6224 |
| .016 | .3796 |

-continued

| Separation | Radius |
|---|---|
| .0267 | .5813 |
| .0267 | −1.2106 |

In each of the five examples given above the dimensions may be scaled within limits determined by the diffraction limit for the 10 micron (μm) wavelength and the homogeneity of the optical materials. The examples have been optimised for relative apertures between f/2 and f/3 and a field of view of about 6° and are conveniently used with aperture diameters of up to 250 mm when performance is close to diffraction limited. As is usual with lens design the relative aperture can be improved with the use of an aspheric surface on the primary lens element A in which case a relative aperture exceeding f/1.5 and aperture diameters up to 500 mm are feasible without performance degradation.

Characteristics of the germanium and halide crystal materials referred to herein are detailed in Table 1. Table 2 details the corresponding characteristics of various chalcogenide glasses which are commercially available.

TABLE 1

| Characteristics of Optical Materials at 10 microns | | | |
|---|---|---|---|
| Material | Refractive index | Dispersion coefficient | Thermal coefficient |
| Germanium | 4.0032 | .00085 | −.00474 |
| KRS 5 | 2.3704 | .00385 | +.00621 |
| KRS 6 | 2.1768 | .01054 | −.00489* |

TABLE 2

| Characteristics of Chalcogenide glasses at 10 microns | | | |
|---|---|---|---|
| Material | Refractive index | Dispersion coefficient | Thermal coefficient |
| TI 1173 | 2.6001 | .00705 | −.00171 |
| TI 20 | 2.4919 | 0.00696 | −0.00174 |
| AMTIR-1 | 2.4975 | 0.00592 | −0.00170 |
| BSA | 2.7792 | .00479 | −.00128 |
| BS1 | 2.4916 | .00660 | −.00171 |
| BS2 | 2.8563 | .00404 | −.00171* |

*Estimated values.

What is claimed is:

1. A telescope objective system formed by a primary lens having a single lens element aligned on a common optical axis with a secondary lens having two lens elements forming a doublet, the shape and power distribution of the lens elements being such as to compensate for monochromatic aberration of the system, each lens element being made of a material which has a useful spectral bandpass in the infrared wavelength region and the lens elements of the secondary lens having refractive surfaces intercepting said optical axis which are substantially spherical, the system having a planar image surface, a postively-powered primary lens and a negatively-powered secondary lens whereby to provide an effective focal length greater than the axial distance between the image surface and the distal refractive surface, said distal refractive surface being formed by said primary lens element which is made of germanium, at least one of the two lens elements of the secondary lens being made of a chalcogenide glass such that the system is achromatic in the infrared wavelength region, wherein both lens elements of the secondary lens are made of chalcogenide glass having a refractive index of about 2.4916 and a dispersion coefficient of 0.00660, the radius of curvature of the respective refractive surfaces and the separations between successive refractive surfaces as listed from said distal refractive surface, in normalised units, being as follows:

| ITEM | Radius | Separation |
|---|---|---|
| Primary Lens | | |
| 1st Refractive Surface | 0.5926 | — |
| 2nd Refractive Surface | 0.7692 | .0427 |
| Secondary Lens | | |
| 1st lens element 1st Refractive Surface | −3.2968 | 0.3948 |
| 1st lens element 2nd Refractive Surface | 0.3825 | .0160 |
| 2nd lens element 1st Refractive Surface | 0.6204 | .0267 |
| 2nd lens element 2nd Refractive Surface | −1.5895 | .0267 | positive radius of curvature indicating a centre of curvature lying on the image plane side of the refractive surface and vice versa.

2. A telescope objective system formed by a primary lens having a single lens element aligned on a common optical axis with a secondary lens having two lens elements forming a doublet, the shape and power distribution of the lens elements being such as to compensate for monochromatic aberration of the system, each lens element being made of a material which has a useful spectral bandpass in the infrared wavelength region and the lens elements of the secondary lens having refractive surfaces intercepting said optical axis which are substantially spherical, the system having a planar image surface, a positively-powered primary lens and a negatively-powered secondary lens whereby to provide an effective focal length greater than the axial distance between the image surface and the distal refractive surface, said distal refractive surface being formed by said primary lens element which is made of germanium, at least one of the two lens elements of the secondary lens being made of a chalcogenide glass such that the system is achromatic in the infrared wavelength region, wherein both lens elements of the secondary lens are made of chalcogenide glass, the secondary lens element proximal the primary lens having a refractive index of about 2.7792 and a dispersion coefficient of 0.00479, the secondary lens element distal the primary lens having refractive index of about 2.4916, the radius of curvature of the respective refractive surfaces and the separations between successive refractive surfaces as listed from said distal refractive surface, in millimeters, being as follows:

| ITEM | | | Radius | Separation |
|---|---|---|---|---|
| Primary Lens | | 1st Refractive Surface | 195.33 | — |
| | | 2nd Refractive Surface | 268.99 | 15.65 |
| Secondary Lens | 1st lens element | 1st Refractive Surface | 825.5 | 113.37 |
| | | 2nd Refractive Surface | 109.22 | 6.05 |
| | 2nd lens element | 1st Refractive Surface | 199.06 | 10.98 |
| | | 2nd Refractive Surface | −2583.9 | 10.00 | positive radius or curvature indicating a centre of curvature lying on the image plane side of the refractive surface and vice versa.

3. A telescope objective system formed by a primary lens having a single lens element aligned on a common optical axis with a secondary lens having two lens elements forming a doublet, the shape and power distribution of the lens elements being such as to compensate for monochromatic aberration of the system, each lens element being made of a material which has a useful spectral bandpass in the infrared wavelength region and the lens elements of the secondary lens having refractive surfaces intercepting said optical axis which are substantially spherical, the system having a planar image surface, a positively-powered primary lens and a negatively-powered secondary lens whereby to provide an effective focal length greater than the axial distance between the image surface and the distal refractive surface, said distal refractive surface being formed by said primary lens element which is made of germanium, at least one of the two lens elements of the secondary lens being made of a chalcogenide glass such that the system is achromatic in the infrared wavelength region, wherein the secondary lens element distal the primary lens is made of halide crystal material having a refractive index of about 2.3704, and a dispersion coefficient of 0.00385, the secondary lens element proximal the primary lens is made of chalcogenide glass having a refractive index of about 2.8563, the radius of curvature of the respective refractive surfaces and the separations between successive refractive surfaces as listed from said distal refractive surface, in normalised units, being as follows:

| ITEM | | Radius | Separation |
|---|---|---|---|
| | 1st Refractive Surface | .5117 | — |
| | 2nd Refractive Surface | .6424 | .0427 |
| 1st lens | 1st Refractive Surface | 7.6224 | .3028 |
| element | 2nd Refractive Surface | .3796 | .016 |
| 2nd lens | 1st Refractive Surface | .5813 | .0267 |
| element | 2nd Refractive Surface | −1.2106 | .0267 | positive radius of curvature indicating a centre of curvature lying on the image plane side of the refractive surface and vice versa.

* * * * *